United States Patent [19]
Croce et al.

[11] 3,853,283
[45] Dec. 10, 1974

[54] RETRACTABLE LEASH DEVICE

[76] Inventors: Joseph Croce, 742 Deer Park Ave., Babylon, N.Y. 11703; Kurt Bayer, 6708 182nd St., Flushing, N.Y. 11365

[22] Filed: June 4, 1973

[21] Appl. No.: 366,776

[52] U.S. Cl............ 242/107.4, 188/82.7, 242/107.6
[51] Int. Cl............................................. B65h 75/48
[58] Field of Search........... 242/107; 74/575, 577 R; 188/82.7; 119/109

[56] References Cited
UNITED STATES PATENTS

| | | | |
|---|---|---|---|
| 2,217,323 | 10/1940 | Sackett | 242/107.4 |
| 2,314,504 | 3/1943 | Lifchultz | 242/107.4 |
| 2,647,703 | 8/1953 | Hayes | 242/107.4 |
| 3,664,599 | 5/1972 | Partridge | 242/107.6 |

*Primary Examiner*—Billy G. Taylor

[57] ABSTRACT

A retractable leash device in which the rotation of a spring-return leash carrying reel is controlled by positioning a cam that established the respective settings of a pair of pawls, both of which cooperate with a single toothed wheel connected to the reel, such that in accordance with the cam position selected, the leash can be freely paid out and retracted by the spring, or locked against further pay-out but freely retracted by the spring upon slackening, or locked against both pay-out and retraction.

6 Claims, 10 Drawing Figures

RETRACTABLE LEASH DEVICE

BACKGROUND AND SUMMARY OF THE INVENTION

This invention relates in general to leash devices, and more particularly to a retractable leash device suitable for dogs and other animals, but not necessarily limited to such use.

An example of a typical prior art retractable leash device is given by my U.S. Pat. No. 3,693,596, issued on Sept. 26, 1972, and the leash device of this instant invention provides new and different design features that allow for simpler and more economical manufacture, and in which most of the parts can be made of molded plastic rather than machined metal. In the leash device disclosed by my U.S. Pat. No. 3,693,596, control of the leash carrying reel was effected by a compounded pair of rachet wheels connected to the reel and a pair of offset mounted pawls each cooperating with a respective rachet. The settings of these pawls were established by a compound cam disposed between them. Such arrangement was rather complex and the location of the cam between the pawls imposed an unsatisfactory high limit on the minimum permissible reel and housing radii, thus tending to make the overall device more bulky and heavier than desired.

The leash device of the present invention requires only a single toothed wheel and a pair of pawls that are mounted to pivot in the same plane as the wheel rotates. Both pawls are set by a single cam in the form of a notched ring that extends around the toothed wheel generally coaxial therewith so as to provide a more compact assembly.

According to a preferred embodiment of the invention, the subject retractable leash device basically comprises a housing, a reel supported by said housing for rotation relative thereto and disposed to receive a leash which is paid out when the reel rotates in one direction and which is retracted when the reel rotates in the opposite direction, means defining a toothed wheel connected to said reel for rotation therewith, a pair of pawls cooperating with said toothed wheel to selectively control the rotation of said wheel and reel, a cam disposed for engagement with both of said pawls and moveable among a plurality of predetermined positions to establish a combination of pawl settings corresponding to a selected wheel and reel rotation condition, and drive means connected to the reel and operable to urge same to rotate in the direction for retracting the leash.

The cam preferably has three preset holding positions to establish respectively a first combination of pawl settings effecting a locking of the wheel and reel in both directions of rotation such that the leash can be neither paid out or retracted, a second combination of pawl settings allowing the wheel and reel to rotate in either direction such that the leash can be freely paid out and retracted upon slackening, and a third combination of pawl settings effecting a locking of the wheel and reel only in a single direction whereby the leash can be freely retracted upon slackening but is locked against further pay-out. It should be noted that a fourth combination of pawl settings can be provided by appropriate shaping of the cam, so that the wheel and reel are locked only in the direction for retracting the leash, thus allowing the leash to be freely paid out but not retracted. Such additional capability is conveniently omitted from the leash device of the invention in order to simplify construction and because in practical operation there would be few occassions when such capability would be used.

The drive means is one which operates to urge the reel to rotate in the leash retraction direction because in the normal use of this leash device, the animal leashed provides the force for pay-out of the leash. Expediently, the drive means includes a coil spring disposed within the housing at one side of the reel and connected thereto for winding thereby into a compressed state when the reel is turned to pay-out the leash. Thus, the spring will automatically retract the leash upon slackening, and no crank or other winding device is required to turn the reel, and the leash device can be held and operated using only one hand.

For a better understanding of the invention, reference should be had to the following detailed description and accompanying drawings which together illustrate a retractable leash device according to a preferred embodiment of the invention.

DESCRIPTION OF A PREFERRED EMBODIMENT OF THE INVENTION

Figure 1:
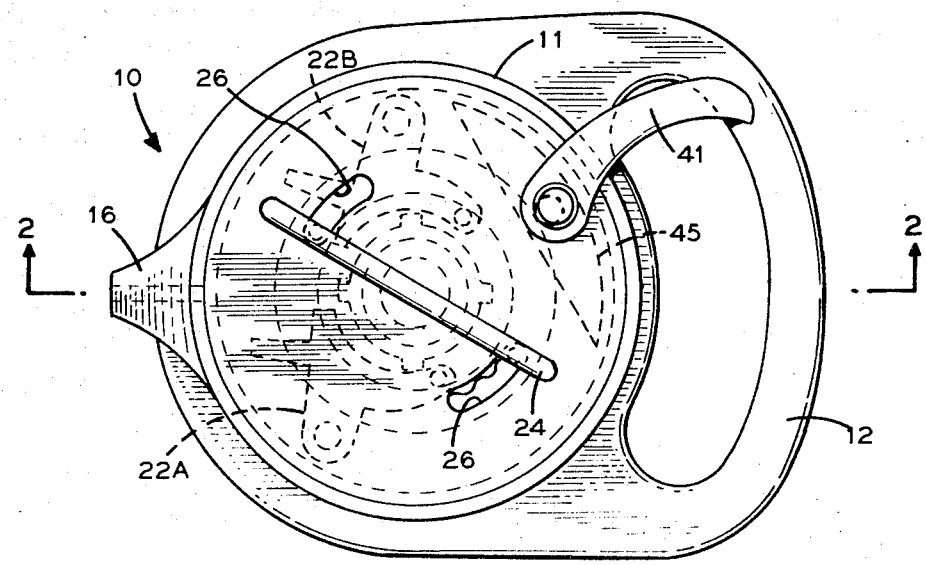
FIG. 1 is a side view of a retractable leash device according to a preferred embodiment of the invention.
Figure 2:
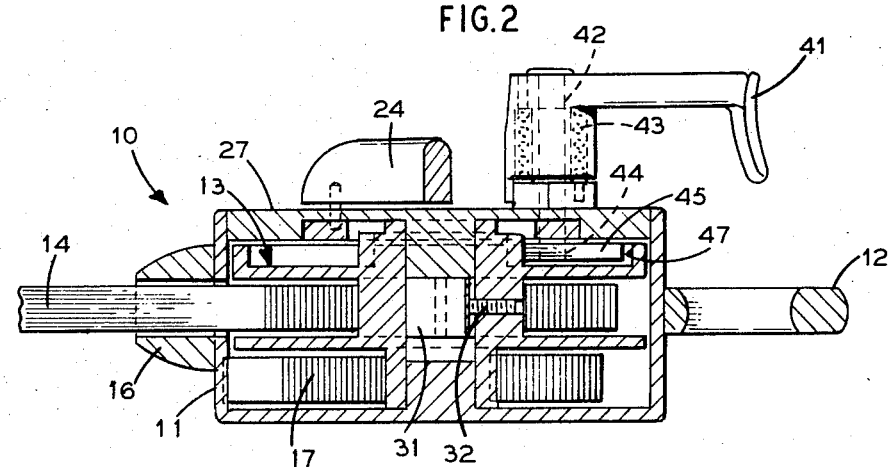
FIG. 2 is a cross-sectional view of the leash device shown in FIG. 1 as taken along line 2 — 2 therein.

FIGS. 1 and 2 exemplify a retractable leash device 10 having a housing 11 equipped with a handle 12, and a reel 13 supported by and within housing 11 for rotation relative thereto. Reel 13 is disposed to receive a leash 14 that is expediently a flat, flexible tape wound around the drum piece 15, (see FIG. 6) and extendible out through mouthpiece 16. When the reel 13 rotates in one direction, leash 14 is paid out, and when reel 13 rotates in the opposite direction, leash 14 is retracted.

Figure 7:
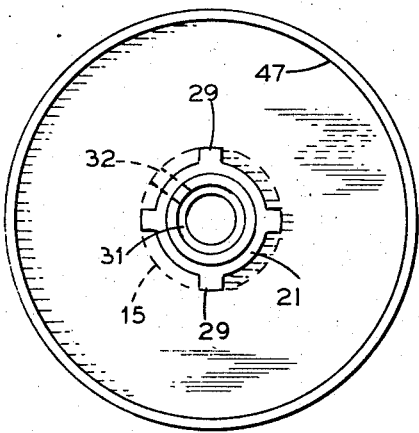
FIG. 7 is a normal view of the leash reel and toothed wheel assembly shown in FIG. 6 as seen looking from the left thereat.
Figure 6:
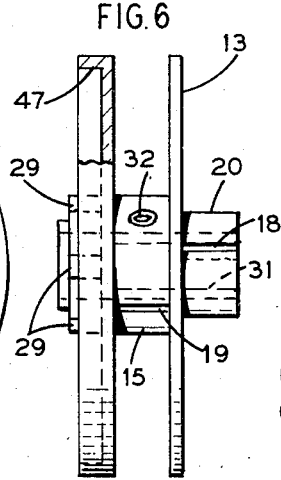
FIG. 6 is an edgewise view of the leash reel and toothed wheel assembly removed from the leash device.
Figure 8:
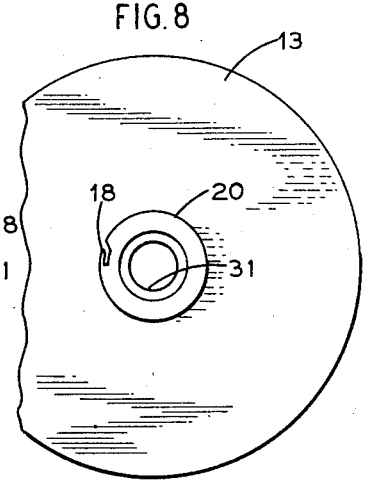
FIG. 8 is a partial normal view of the leash reel and toothed wheel assembly shown in FIG. 6 as seen looking from the right thereat.

A drive means is provided in the form of a coil spring 17 disposed within housing 11 at one side of reel 13 and connected thereto for winding into a compressed state when reel 13 is turned to pay out leash 14. Spring 17 is connected at its outer and to housing 11, and the inner end of spring 17 is connected to reel 13 at the notch 18 provided on sleeve 20, as shown in FIGS. 6 and 8. The extending sleeve 20 around which spring 17 is wound, and a toothed wheel 21, illustrated in the FIGS. 6 – 8, are expediently integrally constructed with reel 13, such as in the form of a unitary assembly of molded plastic. Because spring 17 is wound into compression as leash 14 is paid out, said spring 17 is thus operable to urge reel 13 to rotate in the direction for retracting leash 14.

Leash 14 can be readily installed and replaced, but is securely connected at its inner end to drum piece 15. The inner end portion of leash 14 extends through a slot 19 in piece 15, and is secured by a set screw 32 against an insert 31 received within piece 15.

A pair of pawls 22A and 22B cooperate with toothed wheel 21 to selectively control the rotation of wheel 21 and reel 13. Operation of pawls 22A, 22B in turn is controlled by a ring cam 23 disposed for engagement with both pawls 22A, 22B and moveable among a plurality of predetermined detented positions, FREE MOVEMENT, RETRACT, and LOCK indicated in FIG. 1. Movement of cam 23 is effected by the aid of a spanner 24 connected to cam 23 by screws 25 that extend through diametrically opposed arcuate slots 26 in end plate 27, which is a removable part of housing 11.

Figure 4:
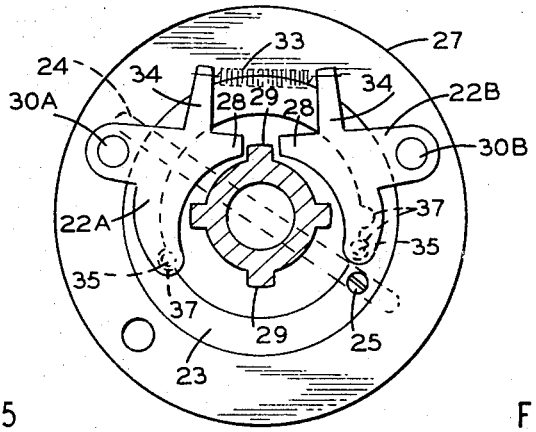
FIG. 4 is a sectional view of the leash device similar to that shown by FIG. 3, but taken with the cam and pawls set to block rotation of the toothed wheel and leash reel in both directions of rotation.
Figure 5:
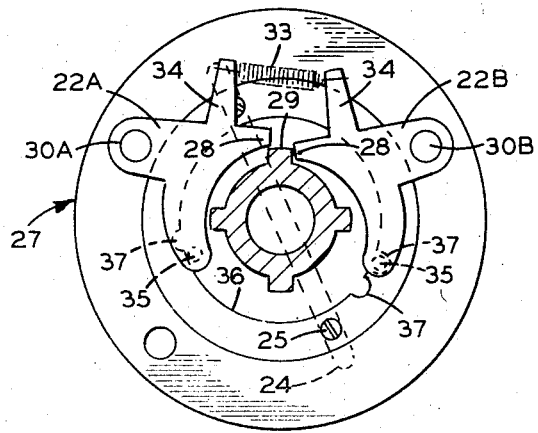
FIG. 5 is a sectional view of the leash device similar to that shown by FIG. 3, but taken with the cam and pawls set to block rotation of the toothed wheel and leash reel only in the direction of rotation corresponding to pay-out of the leash.
Figure 3:
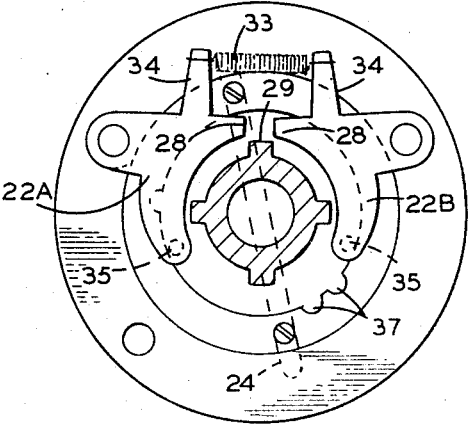
FIG. 3 is a sectional view of the leash device shown in FIGS. 1 and 2, taken along line 3 — 3 of FIG. 2 to show how the cam and pawls are arranged in relation to the toothed wheel, with the cam and pawls being illustrated in settings that allow free rotation of the toothed wheel and leash reel.

In each of the aforesaid positions, cam 23 establishes a combination of pawl 22A, 22B settings corresponding to a selected wheel 21 and reel 13 rotation condition. These various setting combinations are illustrated in FIGS. 3, 4 and 5. To more clearly show how pawls 22A, 22B perform their functions, in the FIGS. 3 – 5, the toothed wheel has been shown, and it should be understood that the wheel 21 is separate from end plate 27, but is received thereon for rotation relative thereto.

A first combination of pawl 22A, 22B settings is shown in FIG. 4 and is the one in which the blocking end 28 of each pawl 22A, 22B is swung into a position of interference with a tooth 29 of wheel 21. This effects a locking of wheel 21 and reel 13 in both directions of rotation such that the leash 14 can be neither paid out or retracted, and this condition is achieved by setting spanner 24 to the LOCK position.

To implement these intended control functions, the pawls 22A, 22B are pivotally connected to end plate 27 by respective pivot means 30A, 30B, and are connected by a tension spring 33 that urges the arms 34 of pawls 22A, 22B toward each other. This causes the ends 28 of pawls 22A, 22B to swing in toward the path swept by the teeth 29 when wheel 21 rotates. Each pawl 22A, 22B has a pin 35 that projects toward plate 27 and is resiliently urged by the action of spring 33 into wiping contact engagement with the inner circumferentially extending edge surface of cam 23. The outer circumferential surface of cam 23 is slidably seated against a recess in plate 27, so that cam 23 is rotatable, generally coaxial with wheel 21 and reel 13, over the limited angular range permitted by slots 26. the inside edge surface of cam 23 has a cylindrical portion 36 of such radius as when pin 35 bears against surface 36, as shown in FIG. 3 for both pawls 22A, 22B, and in FIG. 5 for pawl 22A only, the end 28 of the associated pawl 22A, 22B is swung clear of the rotation path laid by teeth 29. On the inside edge of cam 23 are also notches 37, sized in depth such that when pin 35 is received in a notch 37, as shown in FIGS. 4 and 5, the end 28 of the associated pawl 22A, 22B is swung into the rotation path of teeth 29 to block rotation of wheel 21 and reel 13 in the corresponding direction. As can be appreciated, the pawls 22A, 22B each have two setting positions, one setting position wherein pin 35 is against surface 36, and the second setting position wherein pin 35 is against notch 37. In the first setting position rotation of wheel 21 is not blocked. Only in the second setting position is there blocking of wheel 21, in a single direction which depends on what pawl is in the second setting position.

It can be noted that on the right half of the cam 23 there are provided two notches 37 whereas on the left half of cam 23 there is only one notch 37. These three notches 37 are spaced circumferentially such that when spanner 24 is in the LOCK position, as is the case for FIG. 4, the pins 35 of both pawls will lie in respective notches 37.

When spanner 24 is turned to the RETRACT position, as is the case for FIG. 5, the pin 35 of pawl 22A will lie against surface 36, and the pin 35 of pawl 22B will lie in another notch 37. This causes wheel 21 to be blocked by pawl 22B against rotation in the pay out direction, (clockwise as seen in FIG. 5), but pawl 22A leaves wheel 21 free to rotate in the opposite, or leash retraction direction.

When spanner 24 is turned to the FREE MOVEMENT position, as is the case for FIG. 3, the pin 35 of each pawl 22A, 22B lies against the surface 36 and the wheel 21 is free to turn in either direction.

The three notches 37 are arranged so that the spanner 24, in turning clockwise as seen in FIGS. 3, 4 and 5, passes from LOCK, (FIG. 4), to RETRACT, (FIG. 5), and then to FREE MOVEMENT, (FIG. 3).

With two pawls 22A, 22B, each having two setting positions, a total of four pawl setting combinations are possible, the three previously mentioned, plus a fourth in which pin 35 of pawl 22A would be in a notch (not shown) and pin 35 of pawl 22B would be against surface 36, whereby wheel 21 would be locked against rotation in the leash retraction direction, but free to rotate in the pay out direction. Such additional notch would be on the left half of cam 23, and would require for utilization that the slots 26 be correspondingly lengthened to allow for a four position spanner 24 swing.

While a wheel 21 having four teeth is shown by way of example herein, the number of teeth 29 can be as few as one, since the pawls 22A, 22B when blocking wheel 21 rotation only act against a single tooth 29. However, with a single tooth 29, considerable reel 13 control backlash would result, since the wheel 21 would have up to a full revolution before being stopped by pawl action. Using four teeth 29, the wheel 21 and reel 13 are under control within 90° of rotation. It should be understood that the term toothed wheel as used herein is intended to designate equivalents, such as pins (not shown) projecting from reel 13 in place of the teeth 29.

The particular design of the leash device 10 is simplified for manufacture because the pawls 22A, 22B, cam 23, spanner 24 and associated parts for controlling rotation of the wheel 21 and reel 13 are supported by the end plate 27 which is removable from housing 11.

The invention further provides brake means, operable by a thumb swing lever 41, to engage reel 13 to restrain the rotation thereof so as to control the speed of leash pay out and retraction.

Figure 9:
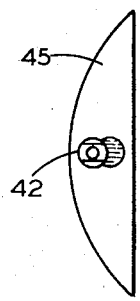
FIG. 9 is a detail view of a brake shoe and its eccentric mounting shaft, used in the leash device.
Figure 10:
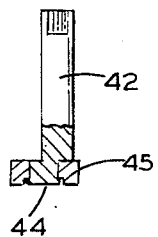
FIG. 10 is a further detail view showing the brake shoe and mounting shaft of FIG. 9 partly in cross section as taken along line 10 – 10 therein.

Lever 41 is connected to a shaft 42, as shown in FIGS. 1 and 2 and is biased by a spring 43 toward a brake-release position. Shaft 42 has an offset end portion 44 that is pivotally connected to a brake shoe 45, shown in FIGS. 9 and 10. Brake shoe 45 is thus eccentrically pivotable, and when lever 41 is swung clockwise in FIG. 1, the arcuate edge of shoe 45 applies braking pressure to the inside rim surface 47 of reel 13.

What is claimed is:

1. A retractable leash device which comprises a housing; a reel supported by said housing for rotation relative thereto and disposed to receive a leash which is paid out when the reel rotates in one direction and which is retracted when the reel rotates in the opposite direction; means defining a toothed wheel connected to said reel for rotation therewith; a pair of pawls mounted on said housing and moveable relative thereto into respective positions of engagement with said toothed wheel to control the rotation of said wheel and reel; an annular cam having multiple camming surfaces and supported by said housing for limited rotary movement relative thereto; means resiliently biasing said pawls into engagement with said cam; said cam having a first set of camming surfaces which when in engagement with said pawls positions both pawls into locking engagement with the toothed wheel to lock the wheel and reel for both directions of rotation such that the leash can be neither paid out or retracted, said cam having a second set of camming surfaces which when in engagement with said pawls positions both pawls out of engagement with the toothed wheel to allow the wheel and reel to rotate in either direction such that the leash can be freely paid out and retracted upon slackening, said cam having a third set of camming surfaces which when in engagement with said pawls positions one pawl into engagement with the toothed wheel to lock the wheel and reel against rotation in the direction corresponding to leash payout such that the leash can be freely retracted upon slackening but is locked against further payout; means operable to rotatably move said cam to selectively position any one of said first, second and third sets of camming surfaces into engagement with said pawls; and drive means connected to said reel and operable to urge same in the direction for retracting the leash.

2. A retractable leash device according to claim 1 wherein said drive means includes a coil spring disposed within the housing at one side of the reel and connected thereto for winding thereby.

3. A retractable leash device according to claim 1 wherein said toothed wheel is integrally connected to said reel.

4. A retractable leash device according to claim 1 wherein said housing has a removeable end plate, and said pawls and cam are supported by said end plate.

5. A retractable leash device according to claim 1 wherein said pawls each have a projecting pin biased into wiping contact engagement with a circumferentially extending surface of said cam.

6. A retractable leash device according to claim 1 including brake means supported by said housing and operable to engage said reel to restrain the rotation thereof.

* * * * *